United States Patent [19]

Bohara et al.

[11] Patent Number: 4,719,442

[45] Date of Patent: Jan. 12, 1988

[54] PLATINUM RESISTANCE THERMOMETER

[75] Inventors: Robert C. Bohara, Eden Prairie; James A. Ruf, Maple Grove, both of Minn.

[73] Assignee: Rosemount Inc., Eden Prairie, Minn.

[21] Appl. No.: 2,196

[22] Filed: Jan. 12, 1987

Related U.S. Application Data

[63] Continuation of Ser. No. 636,142, Jul. 31, 1984, abandoned.

[51] Int. Cl.$^4$ ................................................ H01C 3/04
[52] U.S. Cl. ........................................ 338/25; 338/308
[58] Field of Search ................... 338/25, 28, 307, 308, 338/314; 427/209, 101

[56] References Cited

U.S. PATENT DOCUMENTS

| | | | |
|---|---|---|---|
| 3,115,423 | 12/1963 | Ashworth | 427/102 |
| 3,380,156 | 4/1968 | Lood et al. | 427/102 |
| 3,617,373 | 11/1971 | Mott | 204/192 F |
| 3,645,783 | 2/1972 | Rupert et al. | 117/212 |
| 3,833,410 | 9/1974 | Ang et al. | 117/227 |
| 3,845,443 | 10/1974 | Fisher | 338/25 |
| 4,050,052 | 9/1977 | Reichelt et al. | 338/308 |
| 4,072,593 | 2/1978 | Diehl et al. | 204/192 F |
| 4,085,398 | 4/1978 | Bertram | 338/25 |
| 4,103,275 | 7/1978 | Diehl et al. | 338/25 |
| 4,129,848 | 12/1978 | Frank et al. | 338/308 |
| 4,181,755 | 1/1980 | Liu et al. | 430/314 |
| 4,353,935 | 10/1982 | Symersky | 427/89 |
| 4,375,056 | 2/1983 | Baxter et al. | 338/25 |
| 4,510,178 | 4/1985 | Paulson | 427/102 |

FOREIGN PATENT DOCUMENTS

| | | |
|---|---|---|
| 1014103 | 7/1977 | Canada. |
| 1597403 | 2/1978 | United Kingdom. |
| 2096645 | 10/1982 | United Kingdom. |

OTHER PUBLICATIONS

Chapman, B., *Glow Discharge Processes: Sputtering and Plasma Etching*, John Wiley & Sons, New York, pp. 260-270.

Vossen, John L. and Kern, Werner, eds., *Thin Film Processes*, Academic Press, New York, 1978, pp. 46-50 and 157-160.

Thornton, John A. and Penfold, Alan S., "Cylindrical Magnetron Sputtering", *Thin Film Processes*, John L. Vossen and Werner Kern, eds., Academic Press, New York, 1978, pp. 76-83.

Waits, Robert K., "Planar Magnetron Sputtering", *Thin Film Processes*, John L. Vossen and Werner Kern, eds., Academic Press, New York, 1979, pp. 131-136.

Bennewitz, C. D., et al., "Structrual and Electrical Properties of Films Sputtered from a Pt Cathode in Argon-Oxygen Mixtures," *Journal of Applied Physics*, vol. 46, No. 2, Feb. 1975, pp. 558-567.

Thornton, John A., *Coating Deposition by Sputtering*, notes for sho course entitled "Deposition Technology and Application" given at the University of California, Los Angeles, CA Sep. 13-22, 1978.

Electric Phenomena, V. 97, 1982, p. 689, Abstract No. 97: 154621t.

Chemical Abstracts, V. 91, 1979, p. 616, CA 220426n.

*Primary Examiner*—E. A. Goldberg
*Assistant Examiner*—M. M. Lateef
*Attorney, Agent, or Firm*—Kinney & Lange

[57] ABSTRACT

A platinum resistance therometer is formed in a process which includes the defining of a path for the resistance thermometer in an inert material deposited in a layer on the substrate. The substrate surface is exposed in the path, and the inert material forms a negative pattern for the path. The resistive material for the thermometer is then deposited on both the substrate surface exposed in the path and on the surfaces of the inert material remaining on the substrate. After this, the inert material is etched away, and the resistive material deposited on top of the inert material is then loose and can be removed leaving a strip of resistive material in the desired path for forming the resistive thermometer. The strip has low contamination and impurities to more easily reach the desired temperature coefficent of resistance of the strip forming the thermometer.

15 Claims, 9 Drawing Figures 4,719,442

PLATINUM RESISTANCE THERMOMETER

This is a continuation of application Ser. No. 636,142, filed July 31, 1984 now abandoned.

BACKGROUND OF THE INVENTION

1. Field of the Invention.

The present invention relates to methods of forming resistance thermometers that are easily made in a batch process and provide the desired characteristics.

2. Description of the Prior Art.

Thin film platinum resistance thermometers are gaining acceptance, but there is a problem with obtaining the desired temperature coefficient of resistance (TCR) of the thermometer, and also, in order to obtain the desired nominal resistance, for example 100 ohms, a platinum resistance element formed as a strip or ribbon of substantial continuous lengths made in a serpentine pattern of side by side strip sections. Making a thermometer which has a desired overall small size is difficult. The physical dimensions of the thermometer must be precisely defined so that individual strip or ribbon sections can be placed close to each other, and the platinum strip or ribbon should have a uniform grain from edge to edge, and be free of contaminants to maximize the resistivity of the thermometer.

A process for producing a resistance thermometer element is disclosed in United Kingdom Patent Application, No. 2,096,645, published Oct. 20 1982. Magnetron sputtering under selected atmospheres is disclosed. The thermometer strip deposited is laser trimmed or scribed to define the size of the resistive strip. Controlling the atmosphere is emphasized in this publication in order to obtain a satisfactory thermometer.

U.S. Pat. No. 4,072,593, issued to Diehl et al. on Feb. 7, 1978, discloses a process for *reduction* in size of a resistance element for resistance thermometers. A platinum layer is sputtered onto an insulating solid, using a commercial RF sputtering apparatus and including forming "meanders" by means of a laser beam so that the resistance was standarrized to 100 ohms. This patent discloses methods of sputtering platinum onto a substrate, but does not suggest the use of a path defined in a separate liftoff material to obtain a desired resistance thermometer. The thermometer, after being formed with the desired pattern by a laser beam (or by photo etching) is tempered or heat treated.

U. S. Pat. No. 4,181,755, issued to Liu on Jan. 1, 1980 discloses a way of generating a thin film pattern using a self lifting technique. The process involves depositing a continuous layer of circuit film onto the surface of the substrate, and then a photo resist pattern coincident with the ultimately desired circuit film pattern is defined on the surface of the circuit film. The portion of the circuit film not covered by photo resist is then removed. While retaining the photo resist and the remaining circuit film, the entire surface of the substrate is coated with a barrier film. The photo resist is then stripped away from the surface of the circuit film causing the barrier film that covers the circuit, to liftoff, causing the circuit film to be exposed. The circuit film pattern is then surrounded by a barrier film pattern. The device is used for making a Schottky barrier diode. In this instance, the barrier film is lifted off from a previously deposited conductor, and the patent does not teach or suggest defining a platinum resistive path in an inert liftoff medium, depositing platinum material in the path and then etching away the liftoff medium to leave the thermometer in place.

U.S. Pat. No. 4,353,935, issued to Symersky on Oct. 12, 1982 discloses a method of manufacturing a device having a conductor pattern that utilizes a liftoff technique to define at least one conductor. A multi layer mask is required, and in the preferred embodiment the masking layer uses three sublayers of different materials, but it does provide recesses in the masking layer in the form of the conductive pattern that is to be provided. Etching is used, to expose part of the body surface through the masking layers, and then the conductive layer is deposited on both the masking layer and the exposed surface. The patent does not disclose the use of an inert material as a liftoff medium in which a thermometer pattern is formed and which liftoff material is removed after the platinum thermometer is deposited.

U.S. Pat. No. 4,085,398, issued to Bertram et al. on Apr. 18, 1978 discloses a thin film resistance temperature detector using a copper mask, which is not useful in the present process, which requires an inert liftoff material. Other prior art of interest includes U.S. Pat. No. 4,103,275, issued to Diehl et al. on Jan. 25, 1978 which discloses ionic etching for obtaining a resistance element for resistance thermometers, and U.S. Pat. No. 4,129,848, issued to Frank et al. on Dec. 12, 1978 which discloses a platinum film resistor device which has a layer of quartz deposited upon an insulative substrate, which is sputter etched to produce etch pits in the surface for defining a path of the platinum thermometer. Chemical etching to expose the platinum for sputter etching away excessive platinum is disclosed.

U.S. Pat. No. 4,050,052, issued to Reichelt on Sept. 20, 1977, also discloses a temperature measuring resistor structure, comprising a resistance thermometer, having a strip of platinum applied to a carrier in a predetermined pattern, and discloses depositing the platinum strip while the temperature of the substrate is in the range of 500°–900° C. This patent also discloses heat treatment, but does not disclose any way of obtaining a sharply defined path as with the present process.

The prior art methods all tend to introduce impurities and cause the loss of definition at the edges of the platinum, thus affecting the TCR of the thermometer. For example, laser fabricating tends to melt the edges of the strip; photo etching gives impurities; ionic and sputter etching silicon or silicon dioxide causes deposition of this material into the platinum as impurities, and the platinum structure is affected or damaged at its edges so that there is a loss of definition. Use of masking in present techniques to etch away the platinum film in unwanted areas is a problem because the pattern cannot reasonably be defined with desired precision and uniformity for obtaining a small size and close spacing of the strip sections. The present masking layers tend to deteriorate before the process is complete and impurities tend to be introduced into the platinum.

SUMMARY OF THE INVENTION

A thin film resistance thermometer is formed on a suitable substrate which is substantially inert with respect to the resistance thermometer material. Preferably the resistance material is platinum, deposited on a substrate, such as sapphire, using known techniques which are selected to provide high purity platinum, which is deposited so as to have a columnar grain pattern throughout the thermometer strip or path. The resistance thermometer material is formed in a strip having a meander or serpentine pattern by means of a liftoff process to obtain the desired resistance using as small a surface section as possible.

To manufacture the thermometer, an electrically insulating substrate having a generally flat surface is provided. The substrate surface, is cleaned, and a raised layer of material that is readily etched away is formed as by deposition on the substrate. This material is called a liftoff medium and the medium must be substantially inert with respect to the platinum and substantially noncontaminating to the platinum. The desired pattern is formed as a recessed path in the liftoff medium. The surface of the substrate is exposed in the formed path, where it is desired to deposit the platinum thermometer strip.

Platinum is then deposited onto the substrate in the etched path, where the substrate is exposed, and also over the outer surface of the remaining liftoff medium, to a desired thickness. The depositing of platinum is preferably done by known sputtering techniques and under conditions necessary to obtain a continuous strip of substantially uniform and substantially pure columnar grain platinum suitably affixed to the substrate.

The layer of liftoff material is formed with sharply defined edge surfaces on the perimeter of the path defined for the platinum thermometer. The edge surfaces of the path are substantially normal to the substrate surface and this permits the columnar grain pattern of the platinum to form all the way to the side edges of the thermometer strip.

The deposited layer of platinum tends to be thin adjacent the upper edges of the perimeter of the path formed in the liftoff material. A thin band of platinum is thus formed above the thermometer strip extending to the outer surface of the liftoff medium. These thin bands of platinum are porous when compared to the material deposited in the thermometer path. The thin bands thus permit liquid etch material to penetrate the platinum to act on the liftoff material, and the liftoff material is then etched away. The platinum deposited on the liftoff material and remaining outside the desired thermometer path pattern is then unsupported and easily removed, leaving the platinum in the desired meander or serpentine pattern. The thermometer is a continuous strip or ribbon of substantially uniform crystal structure from edge to edge on the strip or ribbon forming the thermometer. The edge surfaces of the path formed in the liftoff material are substantially normal to the substrate, such that the cross section of the thermometer strip is substantially rectangular and well defined without sharp or significant lateral protrusions or irregularities.

By using a liftoff medium and substrate which are substantially inert with respect to platinum, the purity of the platinum at the edges of the strip formed is maintained throughout its length.

The resulting structure of the platinum is well defined columnar grains which provide a dense, uniform pattern, thus minimizing the size of the platinum resistance thermometer for obtaining the same resistance compared to a noncolumnar grain strip. Since there are no sharp irregularities or sharp lateral protrusions from the sides of each path, (the liftoff medium defines smooth edge surfaces perpendicular to the substrate) the paths may be placed close together.

Impurities in the platinum and defects in the grain structure of the platinum have adverse affects upon the Temperature Coefficient of Resistance (TCR) of the platinum. The disclosed columnar grained structure of the platinum strip, which is uniform and substantially pure from edge to edge of the strip cross section, results in much greater control of the TCR of the platinum pattern. Thus yield of platinum resistance thermometers that achieve the required standard TCR of 3850 parts per million are greatly increased. Batch to batch variations are greatly reduced because of the control of structure and impurities.

DETAILED DESCRIPTION OF THE PREFERRED EMBODIMENTS

Figure 1:
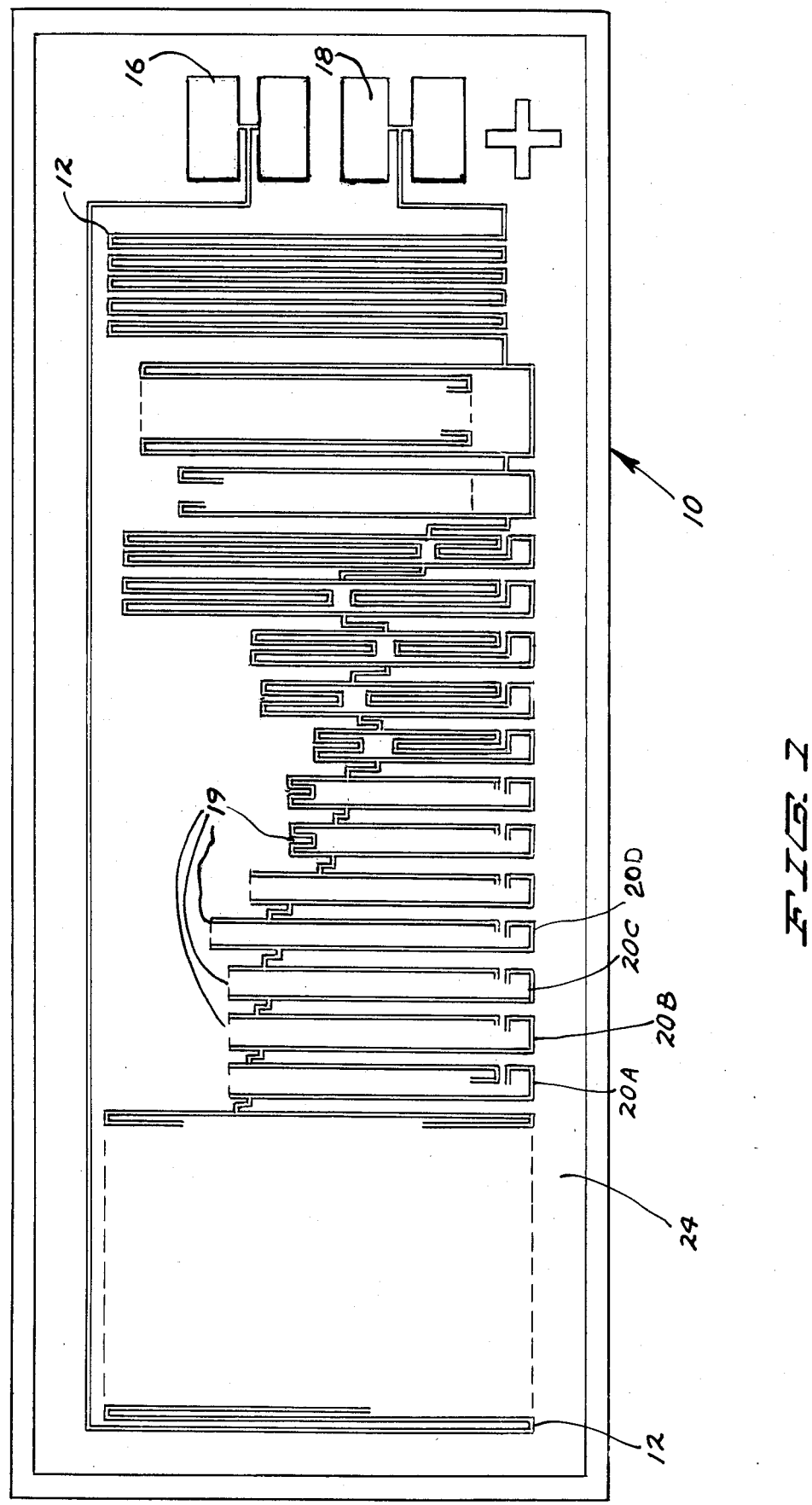
FIG. 1 is an enlarged scale schematic diagram of a typical platinum resistance thermometer having a serpentine platinum strip pattern made according to the present invention defined on a substrate.

A batch fabricated platinum thin film resistance thermometer is indicated generally at 10 in FIG. 1. A platinum resistive strip or ribbon 12 is defined on a substrate 24 in a continuous, serpentine or meander path which is of length to provide a desired resistance utilizing a small, low mass substrate to improve temperature response characteristics. A requirement of thermometer 10 is that it have an industry standard Temperature Coefficient of Resistance (TCR) of approximately 3850 parts per million (ppm) such as listed in DIN (German standard) 43760 or BS (British standard) 1904. Thermometer 10 may typically have a resistance of 100 ohms, although other resistance values also are standard, measured between a pair of electrical contacts 16 and 18 which are at the respective opposite ends of the strip 12. The thermometer desirably has a TCR of 3850 ppm±3 ppm. The strip or ribbon 12 is formed in strip sections at least some of which sections can be trimmed out of the resistance strip to permit trimming the resistance value to a given resistance and tolerance after fabrication.

Several resistive adjustments are provided for by severing the conductive strip 12 at selected locations indicated generally at 20A–20D. Selection and severing the conductive strip patterns at such locations is performed in a conventional manner to obtain the desired resistance value of 100 ohms or other specified value.

In the preferred embodiment showing severance of a conductive path 20A selectively eliminates one section of conductive path of the selected several pairs of parallel conductive path sections 19. Different conductive strip sections 19 are of different resistance values to provide for coarse and fine adjustment to obtain the desired overall resistance. Preferably, the conductive path sections 19 are physically separated from the trimmable conductive path sections indicated at 20A–20D such that impurities introduced while severing them have little or no effect on the desired TCR or on the other desired resistive characteristics. Preferably, severing is performed by means of laser trimming.

Figure 2A:
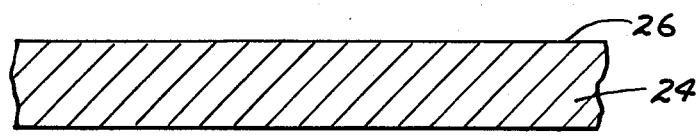
FIG. 2A is a greatly enlarged vertical sectional view of a portion of a typical substrate used for forming a resistance thermometer according to the present invention.
Figure 2B:
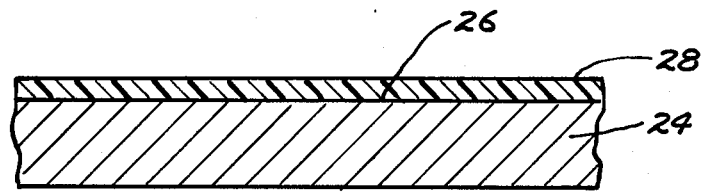
FIG. 2B is a sectional view corresponding to FIG. 2A, with a layer of liftoff medium shown deposited on an upper surface of the substrate with the thickness of the liftoff medium greatly exaggerated for clarity of illustration.

Formation of the platinum strip 12 is done by defining a path in which platinum is deposited as described with reference to FIGS. 2A through 2G, which are of greatly enlarged scale. In FIG. 2A a section of substrate is shown in cross section. The substrate 24 is a non-conductive material which is substantially inert with respect to platinum over a wide temperature range and in reactive atmospheres or environments such as epitaxial grade (high purity) sapphire or aluminum oxide (alumina). Substrate 24 is relatively thin (vertical height), but has sufficient strength to support the serpentine platinum strip. However, the substrate 24 for each thermometer has a low mass for fast temperature response and high strength for ruggedness.

A preferred material is high purity sapphire having a polished surface 26. A ceramic alumina substrate or other materials having similar qualities can also be used. To remove potential impurities which interfere with adhesion and structure formation, the surface 26 of substrate 24 is cleaned in a sulphuric acid/hydrogen peroxide solution.

After cleaning the surface 26 of the substrate 24, a layer of material is called a liftoff medium. The lift-off medium 28 preferably is a material such as silicon dioxide, which is substantially inert with respect to platinum. In a preferred step, the liftoff material 28 is chemical vapor deposited to a preferred depth of about 25,000 Angstroms onto the clean substrate surface 26 using a substantially pure tetra ethyl ortho silicate (TEOS) or substantially pure oxygen and silane sources. This chemical vapor deposition process provides a layer of substantially pure silicon dioxide, with very few atoms of free silicon which could later contaminate the platinum during deposition. A silicon nitride liftoff medium or other inert liftoff medium will also function as the liftoff medium so long as the material selected does not react with platinum or with the atmosphere used when the platinum is deposited, or tend to introduce impurities in the platinum or lose shape during platinum deposition.

Figure 2C:
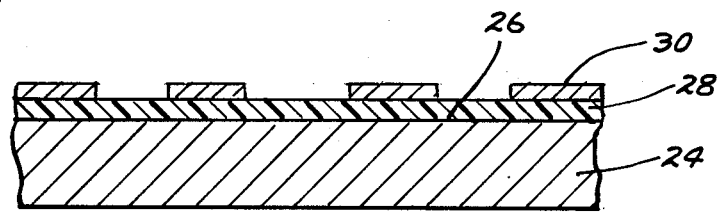
FIG. 2C is a sectional view corresponding to FIG. 2B showing a further step of processing including the deposition of a photo resist material after a desired path pattern has been exposed on the photo resist, and developed leaving the strip pattern in the photo resist over the outer surface of the liftoff medium.
Figure 2D:
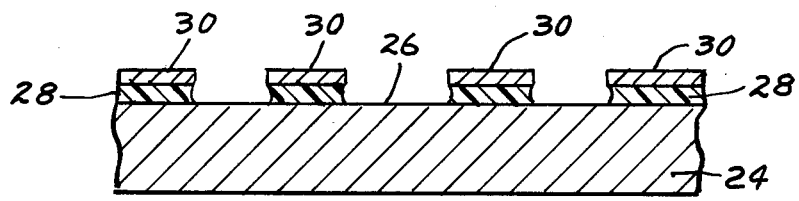
FIG. 2D is a sectional view corresponding to FIG. 2C after the underlying liftoff medium has also been chemically etched in the areas not protected by photo resist, to define a serpentine path on the substrate for deposition of a platinum thermometer strip in such path.

As shown in FIG. 2C, a layer of photo resist 30, such as type KTI 747R, is next applied on top of the layer of liftoff medium 28. The photo resist is then exposed using a conventionally prepared negative mask, forming the desired serpentine or meander pattern for the path in which the platinum strip is deposited. The photo resist is then developed, and rinsed to expose the surface of liftoff medium 28 in the pattern or path which is the desired platinum path or pattern. The photo resist is exposed and developed preferably using stoddard solvent followed by an n-butyl acetate rinse, in a known manner, which does not introduce impurities which could have an adverse effect on the TCR of the subsequently deposited platinum.

A silicon oxide etch is then used to etch away the liftoff medium in the path pattern established in the photo resist. The etching is continued sufficiently long so that the substrate surface 26 is exposed in the desired platinum thermometer path, as shown in section in FIG. 2D.

Figure 2E:
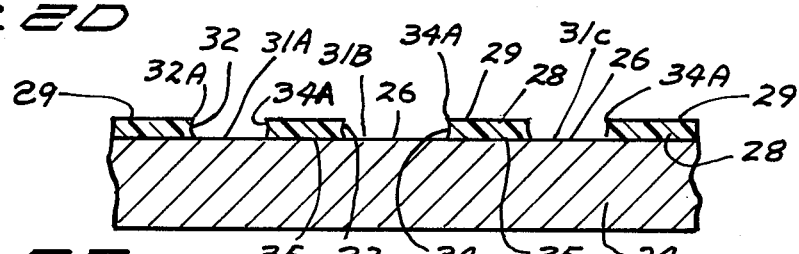
FIG. 2E is a sectional view corresponding to FIG. 2D after the photo resist layer has been removed from the remaining liftoff medium, showing the substrate ready for deposition of the platinum thermometer material in the defined path.

A plasma resist strip or chemical strip is then used to remove photo resist layer 30 from the remaining liftoff medium 28 which is the negative pattern used to define the thermometer path as shown in FIG. 2E. It is important that all photo resist be removed at this stage in the process as it is a source of impurities that could contaminate the platinum that is deposited.

As stated, the liftoff medium 28 is preferably substantially pure silicon dioxide in the negative pattern with no free silicon, which is a potential impurity. Thus, care in using the known techniques to achieve the highest purity of the liftoff medium is desired.

The substrate surface 26 in the exposed path portions shown at 31A, 31B and 31C in FIG. 2E is now ready for deposition of platinum, the resistance thermometer material. Edge surfaces 32 and 34 of the continuous thermometer path are spaced to define the required width of the platinum strip. Edge surfaces 32 and 34 will be generally normal to the substrate surface and they are smooth, but are slightly concave due to the oxide etch acting on medium 28 along the sides of the path. However the lines or edges 32A and 34A (FIG. 2E) between the side surfaces of the path and the upper surface 29 of the remaining portions of the liftoff medium are sharp and well defined. The surfaces 32 and 34 are substantially planar and the undercutting amounts to only a slight bow in the cross section. Both the liftoff medium and the substrate must be inert with respect to platinum and are also chemically, and dimensionally, stable in platinum sputtering environments so that neither the liftoff medium 28 nor substrate 24 will diffuse into or react with the platinum.

Figure 2F:
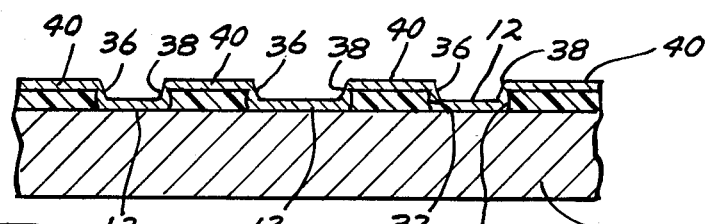
FIG. 2F is a sectional view corresponding to FIG. 2E after deposition of a layer of platinum material by a sputtering process.

As shown in FIG. 2F, a layer of platinum is then sputter deposited in a desired manner which may be as taught in United Kingdom Pat. No. 2096645 of Rosemount Engineering Company Limited No. 8124559, granted Oct. 31, 1984 and published Oct. 20, 1982, or as disclosed in U.S. Pat. No. 4,072,593, issued Feb. 7, 1978 to Diehl, onto the exposed surface 26 of substrate 24 in the path and also across line 32A and 34A onto the surface 29 of the remaining liftoff medium 28. Because care in the platinum desposition is important, reference is made to desired techniques outlined in a course manual for the American Vacuum Society, 1981, short course on Sputter Deposition and Ion Beam Processes sponsored by the American Vacuum Society, 335 East 45th Street, New York, N.Y. and specifically to Chapter VI of the course manual entitled "Coating Deposition by Sputtering" by John A. Thornton; and also to Chapter 4, of the book "Glow Discharge Sources For Sputtering" by W. D. Westwood, at pages 33-36. The platinum is preferably deposited at high temperatures in a reactive environment to obtain the desired grain orientation and purity.

Preferably the platinum sputter deposition is conducted at a slow rate so the deposition time is long enough such that time of sputtering is not a critical factor and precise timing is not required. Stated another way, the time of deposition is capable of being controlled accurately enough for batch processing with repeatable results. Precise control of the thickness of the platinum is therefore easily obtained. Adding to the fact that a precise thickness is not crucial to obtaining desired TCR, it is seen that the platinum deposition step is easily controlled within desired limits to obtain required thickness of the platinum. Therefore, repeatability of the procedure is easily obtained even without overly precise controls on time. The deposited platinum has a columnar grain, as will be described, throughout the length, wide and thickness of the strip, and reaches the desired TCR in batch processing.

An important feature of this method is its insensitivity to process variation. When etching away the liftoff medium to form the platinum path pattern, excessive undercutting of surfaces 32 and 34 can be a concern, but undercutting is easily monitored and controlled with known standard etching procedures. When stripping the photo resist used to define the platinum pattern in the liftoff medium, the stripping material disclosed does not adversely affect the liftoff medium or the substrate, so if stripping is continued for too long a time, no adverse effects are noticed. If the final liftoff etching conditions during the process unexpectedly vary, the variation will not likely cause scrapping of the substrate because the etching does not require critical solution strengths or timing. The etching steps must be continued long enough to remove materials which could result in defects.

It is important that materials proximate to the platinum do not react with platinum at high temperatures in a reactive environment or atmosphere so that harmful impurities are not introduced into the platinum.

The platinum layer is deposited to a thickness of approximately 17,000 Angstroms, which is not as thick as the thickness (vertical height) of the layer of liftoff medium 28 (approximately 25,000 Angstroms). Thus, as shown in FIG. 2F, after deposition of the platinum, the resistance thermometer strip or ribbon 12 does not have a thickness or height equal to the full height of the side surfaces 32 and 34 defining the path for the thermometer. Because the edges 32A and 34A do not round off as the deposition progresses, thin bands of porous, interconnecting layer sections 36 and 38 of platinum form along the side surfaces 32 and 34 for the distance that the liftoff medium layer 28 extends outwardly in thickness beyond 17,000 Angstroms, which is the deposited platinum strip height or thickness in the paths. The bands 36 and 38 form thin porous bands of platinum approximately 8000 Angstroms wide adjacent the edges 32A and 34A along the entire path.

Platinum thickness of the platinum thermometer strip deposited in each path may range from 14,000 Angstroms to 30,000 Angstroms if desired, provided the thickness of the liftoff medium 28 is correspondingly changed so that it is always thicker than the desired thickness of the platinum strip. The liftoff medium 28 preferably has a thickness of at least 1.3 to 1.5 times the thickness (height above surface 26) of the platinum that is deposited.

Figure 2G:
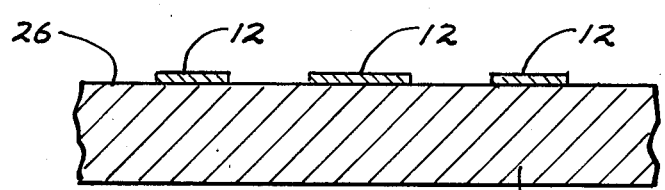
FIG. 2G is a sectional view of the finished platinum resistance thermometer showing the platinum meander paths in section, and corresponding to FIG. 2F, after the liftoff medium has been etched away and the platinum material deposited on the upper surface of the liftoff material has been removed.

The thin band sections of platinum 36 and 38 are generally sufficiently porous so that a liquid etchant will penetrate the thin strip layer sections. An etchant such as hydrofluoric acid, which has little effect on either platinum or the substrate 24, is then used to etch away the remaining parts of the liftoff medium. Since the etchant has little effect on the platinum or substrate the timing and temperature of the etch of the final liftoff medium is noncritical and has little effect on the yield of acceptable thermometers from a substrate, that is, normal variations in time and temperature of the final etchant will not result in an increased scrap rate. After etching all of the liftoff medium away, the portions of the platinum layer indicated at 40 which were deposited on top of the liftoff medium may be mechanically separated from the upper edges of the platinum thermometer strip or ribbon 12 in the region of the thin bands 36 and 38. This can be accomplished by lifting the sections 40 or by rubbing the platinum with a suitable pad to break off sections 40. The thermometer strip or ribbon 12 is tightly bonded to the substrate surface so it will not come loose. The thin platinum bands 36 and 38 are also rubbed to remove any thin or irregular edges on the strip 12, which would tend to break off in use and change the overall resistance of thermometer 10. FIG. 2G illustrates the device at this point in the process.

An optional step may be performed to aid etching away the liftoff medium if desired. Before liftoff medium 28 is etched away, a mild platinum etch may be used to etch the thin bands 36 and 38 for approximately five to fifteen minutes with, for example, a solution consisting of $10H_2O: 9HCl: 1HNO_3$. The thickness of the platinum strip 12 on substrate surface 26 is not appreciably affected by such mild etch, but the thin bands 36 and 38 are substantially removed during such an etch step because the bands are very thin and porous as compared to the thermometer strip or ribbon 12 secured to substrate surface 26. When the thin bands 36 and 38 are substantially removed by the optional platinum etch, liftoff medium 28 in the negative pattern is then etched away as described above and the platinum layer sections 40 are easily removed because they will be loose, and can be blown off by a gas flow across substrate surface 26.

Thermometer 10 is then cleaned as desired, and is then heat treated for approximately six hours at a temperature of 1000° C. in an oxygen atmosphere. The heat treatment does not remove the columnar crystal structure, but only compacts the film. Thus, during heat treatment, the thickness of platinum strip or ribbon 12 above the substrate surface decreases to approximately one half of the deposited thickness (7000 Angstroms to 15,000 Angstroms), and the conductivity of the platinum strip or ribbon 12 increases. The heat treatment temperature may vary from 800° to 1000° C. and the thermometer is heat treated for between five and seven hours.

It has been found that a platinum strip thickness (above the substrate) after heat treatment of at least 7000 Angstroms provides the desired TCR. During initial heat treatment, the TCR and the platinum resistivity change quickly, but then change relatively slowly toward the end of the heat treatment so that the TCR and platinum resistivity do not vary significantly from batch to batch, with reasonable time controls.

Figure 3:
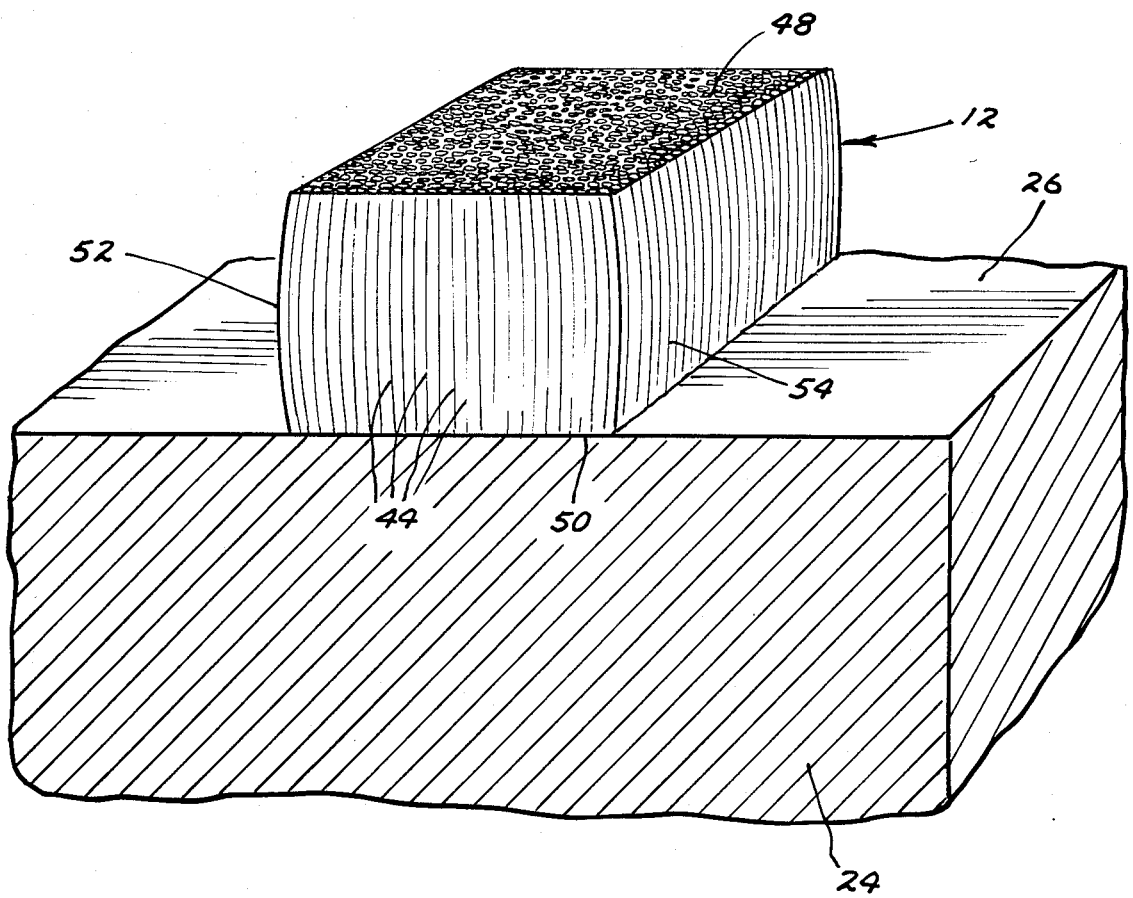
FIG. 3 is a detailed enlarged cross section representation of a platinum strip defined on the substrate in accordance with the present invention.

In FIG. 3, wherein the numbering is consistent with the foregoing figures, the structure of the platinum strip or ribbon 12 is shown in enlarged cross section, and when the platinum is deposited as described comprises closely packed columnar grains 44 of platinum. The grains 44 are preferably substantially continuous in length in the thickness or height direction of the strip, and have longitudinal axes normal to substrate surface 26. A substantial portion of the grains are continuous if the sputtering is done carefully as described. The platinum strip structure comprises a top surface 48, a bottom surface 50, which is bonded or secured to or interfaced with substrate surface 26, a first side surface 52 and a second side surface 54. First side surface 52 and second side surface 54 are smooth, but curve very slightly outwardly (they are convex) corresponding to the slight inward curve or concavity of surfaces 32 and 34 of the liftoff medium.

The columnar grains 44 are uniformly dispersed substantially over the entire section of strip or ribbon 12 out to first side surface 52, and to second side surface 54, due to the structural stability of the liftoff medium during deposition of the platinum. Thus, substantially the entire strip has the columnar grain. The paths for the platinum strip or ribbon 12 remain sharply defined in the liftoff medium during deposition of the platinum.

Since the liftoff medium 28 is inert with respect to platinum and dimensionally stable in the sputtering environment, few impurities or structural defects occur at first and second side surfaces 52 and 54. Thus, first and second side surfaces 52 and 54 are well defined, smooth, and are substantially normal to substrate surface 26. This provides yet a further benefit in that the platinum paths may be formed or placed closer together, so that the platinum strips are closer together. If the sides of the paths in the liftoff medium exhibit significant lateral protrusions, are not structurally intact, or tend to spread out over the surface of the substrate as the platinum is deposited, there is an increased probability of electrically shorting between the sections of the strip or ribbon formed in the paths. With the structure of platinum shown in FIG. 3, the desired TCR is obtained and a smaller thermometer size is achieved because of the well defined sides of the strip or ribbon sections. A platinum strip width of 20 micrometers with a distance of 20 micrometers between the strip sections is easily batch fabricated using the above described liftoff technique.

The liftoff technique permits smaller thermometer size regardless whether the platinum is deposited in a columnar structure or not. Because of the non-reactive structurally stable materials used for the liftoff medium that defines the paths, the side surfaces of each path are well defined and substantially free of impurities. If the side surfaces have impurities or are not well defined, the TCR of the deposited platinum will be lowered. Of course, the bulk or volume of the platinum is an important consideration for achieving the TCR.

With low levels of impurities in the platinum, the platinum strip thickness must be increased to increase the TCR. With increased thickness of the strip 12, the sheet resistivity decreases and the strips must be made narrower, or longer, to obtain the desired operating resistance for the thermometer. Prior means of pattern definition introduce substantial impurities in the platinum along the edges. Hence making the pattern narrower with prior processes introduced more impurities and further lowered the TCR. Thus, a longer, more extensive strip or ribbon pattern was needed to obtain desired resistances and TCR's in prior art devices. With high levels of impurities in the platinum the thermometer will never reach the desired TCR.

The added benefit of the columnar platinum grain structure is that even more control of the TCR is obtained with excellent repeatability. The precise thickness of the platinum layer having the columnar grain structure is not significant with respect to the TCR of the strip or ribbon in the selected range of platinum thicknesses. Thus precise timing of the platinum deposition is not required, and successful processing of each batch is greatly enhanced under commercial conditions.

Although the present invention has been described with reference to preferred embodiments, workers skilled in the art will recognize that changes may be made in form and detail without departing from the spirit and scope of the invention.

What is claimed is:

1. A batch fabricated thin film platinum resistance thermometer comprising:
    substrate means for supporting the platinum; and
    a resistive strip formed in a serpentine pattern on the substrate means and having an outer surface spaced from the substrate and side surfaces extending outwardly from the substrate means to join the outer surface and defining a length, a predetermined thickness on the substrate means and opposite outer side edges where the outer surface and respective side surfaces join, said side edges defining a width of the strip, characterized in that the strip comprises a substantially uniform structure of closely spaced columnar grains of platinum throughout the length, thickness and width of the strip, said structure being substantially unchanged adjacent its outer side edges from other portions of the strip with columnar grains defining the side surfaces.

2. The resistance thermometer of claim 1, wherein the platinum strip is sputter dispositied to be of substantially the same purity throughout its length, thickness and width.

3. The resistance thermometer of claim 1 wherein the side surfaces of the strip are smooth.

4. The resistance thermometer of claim 2 wherein the side surfaces of the strip are substantially smooth and free of significant lateral protrusions such that the sections of the strip may be spaced short distances from each other without undesirable electrical shorting effects.

5. The resistance thermometer of claim 1 wherein the grains of platinum are substantially normal to the surface of the substrate means.

6. The resistance thermometer of claim 5 wherein a substantial portion of the grains of platinum are continuous throughout the thickness of the strip.

7. The resistance thermometer of claim 1 wherein the substrate means is substantially inert with respect to platinum.

8. The resistance thermometer of claim 1 wherein the substrate means is sapphire.

9. The resistance thermometer of claim 1 wherein the substrate means is alumina.

10. The resistance thermometer of claim 1 wherein the substrate means is substantially inert with respect to platinum and wherein the grains of platinum are substantially continuous throughout the thickness of the strip.

11. The resistance thermometer of claim 1 wherein the strip comprises a plurality of side-by-side strip sections and wherein such paths are separable by short distances as a function of edge definition.

12. The resistance thermometer of claim 11 wherein the strip sections are separated by substantially 20 micrometers.

13. A batch fabricated thin film platinum resistance thermometer comprising:

substrate means for supporting the platinum thermometer; and a resistive platinum strip formed in a serpentine pattern on the substrate means and having an outer surface defining a length, a predetermined thickness and opposite side surfaces defining a width of the strip, outer edges being formed where the outer and side surfaces join, characterized in that the platinum strip is formed by depositing the platinum in a uniform coating on portions of the substrate means exposed in a defined path in between walls defined in an inert lift off medium on the substrate means, and also depositing the platinum on the lift off medium, and then removing the lift off medium and platinum deposited thereon so that the platinum strip comprises a substantially uniform structure of closely spaced columnar grains of platinum throughout the length, thickness and width of the platinum strip, said structure of columnar grains being substantially unchanged adjacent the outer edges of the platinum strip from other portions of the platinum strip.

14. The platinum thermometer of claim 13 wherein the columnar grain is left as deposited adjacent the outer edges by etching the liftoff medium off the substrate means after depositing the platinum in the paths and removing the platinum deposited on the lift off medium in regions other than in the defined paths.

15. The platinum thermometer of claim 14 wherein the platinum strip thickness is of a thickness less than the thickness of the liftoff medium on the substrate means so the walls of the defined path extend from the substrate means more than the thickness of the platinum strip after depositing the platinum to cause porous strips of platinum to be initially formed adjacent the outer edges of the resistive platinum strip which are mechanically removed to leave the columnar grains of platinum on the sides of the resistive platinum strip.

* * * * *

UNITED STATES PATENT AND TRADEMARK OFFICE
CERTIFICATE OF CORRECTION

PATENT NO. : 4,719,442

DATED : January 12, 1988

INVENTOR(S) : Robert C. Bohara et al.

It is certified that error appears in the above-identified patent and that said Letters Patent is hereby corrected as shown below:

In the Abstract, line 1, delete "therometer", insert --thermometer--;

Column 1, line 42, delete "standarrized", insert --standardized--;

Column 5, line 49, after "material", delete "is called a liftoff medium", and insert, --28 is deposited on the surface 26. This material is called a liftoff medium.--;

Column 6, line 60, delete "desposition", insert --deposition--;

Column 10, line 39, delete "disposited", and insert --deposited--.

Signed and Sealed this

Nineteenth Day of July, 1988

Attest:

DONALD J. QUIGG

Attesting Officer

Commissioner of Patents and Trademarks